(12) United States Patent
Dayton

(10) Patent No.: US 6,325,296 B1
(45) Date of Patent: Dec. 4, 2001

(54) QUIETING A THERMAL EXPANSION VALVE

(75) Inventor: Robert A. Dayton, Attica, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/625,454

(22) Filed: Jul. 26, 2000

(51) Int. Cl.[7] ..................................................... F25B 41/04
(52) U.S. Cl. ............................. 236/92 B; 62/225; 62/296
(58) Field of Search .................... 62/225, 296; 236/92 B

(56) References Cited

U.S. PATENT DOCUMENTS

| | | | |
|---|---|---|---|
| 2,573,522 | * | 10/1951 | Watt ........................................ 62/296 |
| 3,815,379 | * | 6/1974 | Scherer et al. .......................... 62/296 |
| 4,381,651 | * | 5/1983 | Kubo et al. ............................. 62/296 |
| 6,148,631 | * | 11/2000 | Watanabe et al. ...................... 62/296 |

FOREIGN PATENT DOCUMENTS

| | | | | |
|---|---|---|---|---|
| 5-141813-A | * | 6/1993 | (JP) | ........................................ 62/296 |
| 5-264129-A | * | 10/1993 | (JP) | ........................................ 62/296 |

* cited by examiner

*Primary Examiner*—William E. Tapolcai
(74) *Attorney, Agent, or Firm*—Roger A. Johnston

(57) ABSTRACT

A method of reducing flow noise in a thermally responsive expansion valve of the type for controlling flow of a relatively high pressure refrigerant from a condenser applied to its inlet at a substantially reduced pressure for circulation through an evaporator and including a solenoid operated shut-off valve in the inlet of the expansion valve. A reduced diameter flow passage is formed in the inlet upstream of the shut-off valve and a micro-porous element disposed in the reduced diameter passage and is operative for substantially reducing flow noise. The micro-porous element preferably has passage of about forty to one hundred eighty microns.

10 Claims, 2 Drawing Sheets

QUIETING A THERMAL EXPANSION VALVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to expansion valves of the type employed for controlling flow of liquid refrigerant at relatively high pressure to enable the refrigerant to be circulated at a substantially reduced pressure through a heat exchanger or evaporator over which is directed a flow of air for cooling a compartment such as the passenger compartment of a motor vehicle. Such expansion valves are well known in the art and one type of known expansion valve is controlled by a thermally responsive liquid filled capsule which utilizes the expansion and contraction of the liquid fill in the capsule to move a diaphragm which movement in turn operates a valve member for controlling flow through the valve from a minimum bleed flow to a maximum flow. Furthermore, it is also known to provide a supplemental solenoid operated shut-off valve in the inlet of the expansion valve for permitting complete shut-off of the flow remotely by an electrical control.

However, problems have been encountered in the aforesaid type of valve inasmuch as flow noise has been generated within the valve which has been found to be prohibitive from the standpoint of annoyance to the occupants of the passenger compartment of the motor vehicle. Efforts to muffle the sound in the refrigerant conduits and in the mounting of the valve body to the vehicle structure have generally proven unsuccessful. Therefore, it has long been desired to provide a simple and low cost, but effective way of reducing or minimizing the flow noise of refrigerant flowing from the high pressure inlet side to a substantially reduced lower pressure outlet in a refrigerant flow control or expansion valve.

BRIEF SUMMARY OF THE INVENTION

The present invention provides a solution to the above-described problem of quieting flow noise in a thermal expansion valve for controlling flow of refrigerant from the high pressure effluent of a condenser to a substantially reduced pressure evaporator and particularly in thermal expansion valves of the type having a supplemental solenoid operated shut-off valve in the inlet. The valve assembly of the present invention includes a reduced flow area passage between the high pressure inlet and the electrically operated shut-off valve by providing a micro-porous element in the reduced area flow passage for providing flow through a plurality of small passages in the micro-porous element. The present invention thus permits a simple modification of the valve body to include the micro-porous element in a passage formed in the inlet and therefore eliminates the need for complete retooling of the valve body. The micro-porous element is preferably a sintered bronze or sintered stainless steel element which is sufficiently robust and low in manufacturing cost to provide a simple yet cost-effective technique for modifying an existing thermal expansion valve to reduce flow noise. In the preferred practice of the invention, the micro-porous element has a porosity in the range of about forty to one hundred eight microns.

DETAILED DESCRIPTION OF THE INVENTION

Figure 1:
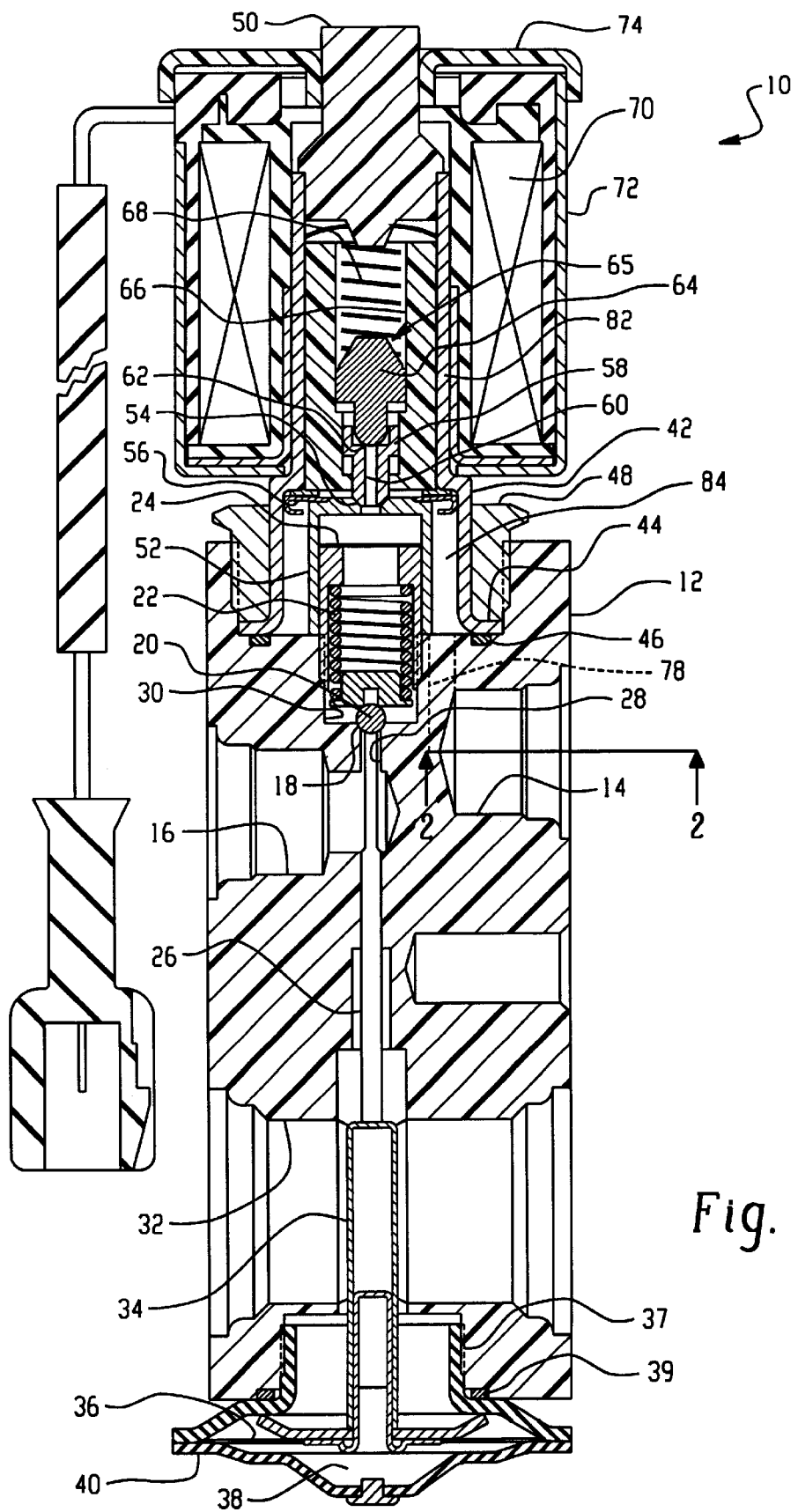
FIG. 1 is a cross-section of the completed valve assembly of the present invention; and, FIG. 2 is a portion of a section view taken along section indicating lines 2—2 of FIG. 1.
Figure 2:
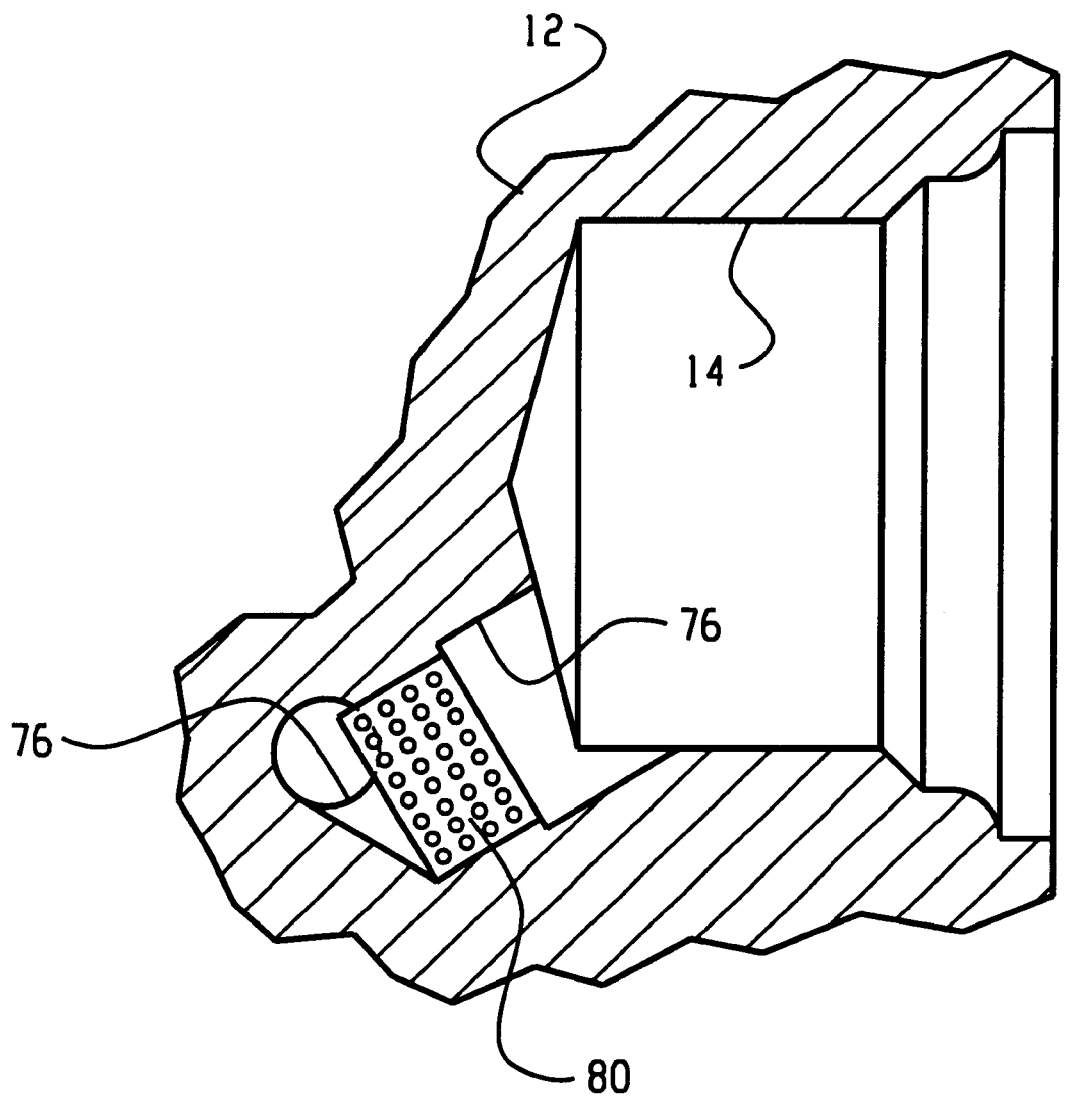

Referring to FIGS. 1 and 2, the valve assembly of the present invention is indicated generally at 10 and includes a valve body 12 having a high pressure inlet passage 14 and a reduced pressure outlet passage 16 with a valve seat 18 formed in the valve body between the inlet 14 and outlet 16. A moveable valve member or obturator in the form of a spherical member 20 is biased against the valve seat 18 by a spring 22 which is retained in the valve body by a threaded retaining collar 24 which has registered against its undersurface the upper end of spring 22. The valve member 20 is contacted by the upper end of an operating member or rod 26 which extends through passage 28 and which interconnects a valving chamber 30 above the valve seat 18 with outlet passage 16. The lower end of the operating rod 26 extends downwardly through an open return passage 32 formed through block 12 which is adapted to have refrigerant discharging from the evaporator flowing therethrough. Rod 26 has the lower end operatively contacting the upper end of a hollow sensing tube 34 which is connected to a flexible diaphragm 36 which forms a wall of a fluid filled chamber 38 disposed in a capsule 40 attached by threads 37 to the lower end of valve body 12 and sealed thereon by a suitable seal ring 39.

An armature guide in the form of a generally cylindrical tubular member 42 has the lower end thereof flanged outwardly as denoted by reference numeral 44 and sealed in the upper end of the valve body 12 by a suitable seal ring 46 and retained therein by a threaded annular member 48. The armature guide 42 is closed and sealed at its upper end by a ferromagnetic pole piece 50. The armature guide 42 retains an inverted cup-shaped valve seat member 52 which is sealed over collar 24 and which has a valve seat 54 formed in the upper end thereof with a spring-like retainer 56 attached thereto. A main shut-off valve member 58 is disposed thereagainst for movement between a position opening and a position closing the valve seat 54 which it will be understood communicates with the valving chamber 30 and a passage 28 which communicates with outlet 16.

Valve member 58 has a pilot passage 60 formed therethrough which has a pilot valve seat 62 formed on the upper end thereof against which is seated a pilot valve member 64 preferably formed of aluminum indicated generally at 65 which is slidably disposed within a guide member or armature 66. The valve member 64 is biased downwardly against the pilot seat 62 by a spring 68 which has its upper end registered against the undersurface of pole piece 50.

An encapsulated coil 70 is disposed over the armature guide tube 42, a flux collecting sleeve 82, and an outer flux collector shell 72 disposed thereover with a flux collecting washer 74 received over the upper end thereof and attached thereto completing the flux loop between outer shell 72 and pole piece 50.

Referring particularly to FIG. 2, inlet passage 14 communicates with a cross passage 76 of reduced cross-sectional area; and, passage 76 intersects a vertical riser passage 78 shown in dashed outline in FIG. 1 which communicates with the valving chamber 84 within the lower enlarged diameter end of the armature guide 42. Thus, the supply pressure in inlet passage 14 is in open communication with the interior of the armature guide 42 and is prevented from achieving pressure equalization across the main shut-off valve member 58 when the pilot valve member 64 is seated on pilot valve seat 62.

A porous element 80 is disposed in the passage 76 and provides a plurality of very small passages therethrough with respect to the area of passage 76. In the present practice of the invention, the element 80 preferably comprises a sintered metal element having a porosity of about forty to eighty microns and preferably about ninety microns. In the present practice of the invention the element 80 is preferably formed of sintered bronze or sintered stainless steel material although other materials may be utilized if desired.

In operation, upon energization of coil 70, pilot valve member 64 inside of armature 65 is moved upwardly overcoming the bias of spring 68 to permit refrigerant within the upper portion of the armature guide 42 to flow downwardly through pilot passage 60 thereby reducing the pressure over the upper end of main shut-off valve member 58 allowing the armature 66 to move the main shut-off valve member 58 upwardly to an open position thereby permitting fluid flow to valving chamber 30 and to supply the flow control valve scat 18 and passage 28 for flow to outlet 16. The flow over valve seat 18 is regulated by the rod 26 moving valve member 20 responsive to pressure changes in the fluid 38 within capsule 40 as by the sensed temperature of the liquid within the tube 34 which is exposed to refrigerant flowing through passage 32.

When shut-off valve 58 is open and refrigerant is flowing to outlet 16, the micro-porous element 80 functions to prevent flow noise within the valve.

The present invention thus enables an existing refrigerant thermal expansion valve within an electrically operated shut-off valve provided in the inlet to be modified by addition of a passage 76 in the inlet and a micro-porous element 80 to provide suitable reduction of flow noise without incurring the substantial expenses associated with retooling the valve.

Although the invention has hereinabove been described with respect to the illustrated embodiments, it will be understood that the invention is capable of modification and variation and is limited only by the following claims.

What is claimed is:

1. A method of reducing flow-noise in a refrigerant expansion valve comprising:
    (a) providing an inlet passage in a valve block;
    (b) forming an outlet passage in the valve block and disposing a valve seat in said outlet passage and moving a valve member with respect to said valve seat;
    (c) connecting said inlet passage with a cross passage having a flow area significantly less than the flow area of said inlet passage and connecting a riser passage at generally right angles to said cross passage and connecting said riser passage with a valving chamber having a shutoff valve therein and connecting the shutoff valve to said valve seat; and,
    (d) disposing a porous element in said cross passage, said porous element having the porosity thereof substantially less than the flow area of said cross passage.

2. The method defined in claim 1, wherein said step of disposing a porous element includes disposing a sintered granular metal element.

3. The method defined in claim 1, wherein said step of disposing a porous element includes disposing a sintered bronze or sintered stainless steel element having a porosity of about 40 to 180 microns.

4. The method defined in claim 1, wherein said step of connecting with a cross passage includes forming a flow area of about 0.0113 in.$^2$(7.30 mm$^2$).

5. The method defined in claim 1, wherein said step of disposing a porous element includes disposing a semi-solid having a generally cylindrical configuration.

6. The method defined in claim 1, wherein said step of disposing a valve member includes disposing a flow control valve intermediate said valve seat and said outlet; and, disposing a thermally responsive actuator on said body and connecting said actuator to said flow control valve and controlling flow from said inlet to said outlet.

7. The method defined in claim 1, wherein said step of moving a valve member includes moving a valve member between an open and closed position and includes energizing a solenoid.

8. The method defined in claim 1, wherein said step of disposing a porous element includes disposing a sintered bronze or stainless steel element having a porosity of about 90 microns.

9. An expansion valve assembly according to the method of claim 1, comprising:
    (a) a valve body having an inlet port, an outlet port and a valve obturator moveable for controlling flow in a flow passage between said inlet and outlet and a sensing passage adapted for connection to a flow of fluid to be monitored therein;
    (b) a temperature responsive capsule attached to said body and operable for effecting said obturator movement in response to the temperature of fluid in said sensing passage;
    (c) an electrically operated shut-off valve disposed in said flow passage between said obturator and said inlet and having a valving chamber between said inlet and said shutoff valve;
    (d) a porous element disposed in said flow passage between said inlet and said valving chamber of said electrically operated valve, said element having a plurality of passages therethrough, with each passage having the flow area thereof substantially reduced from the area of said flow passage.

10. The valve assembly defined in claim 9, wherein said porous element has a porosity of about 40 to 180 microns.

* * * * *